July 2, 1957     G. B. EDWARDS, JR     2,797,513
LICENSE PLATE COVER
Filed Sept. 4, 1953
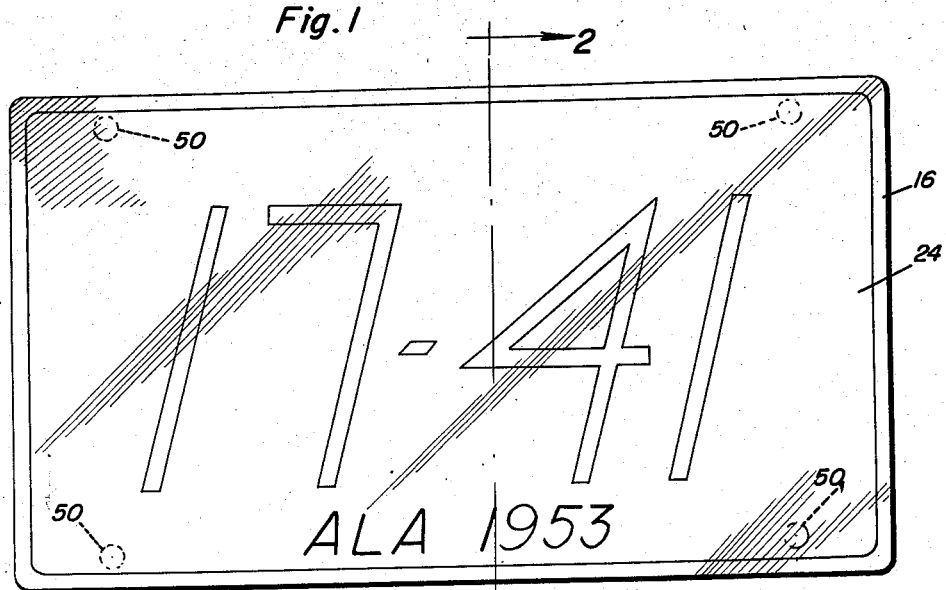
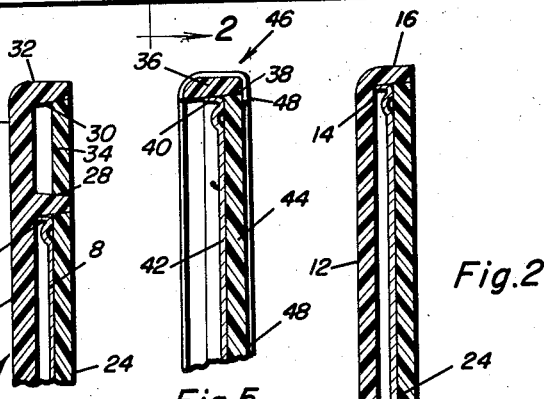
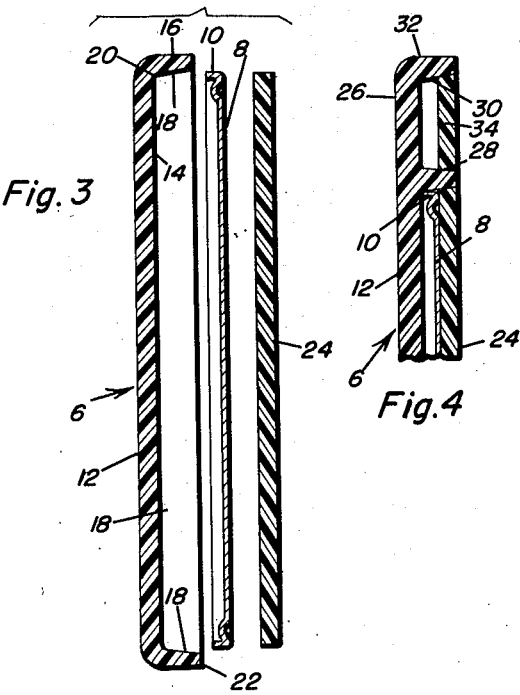
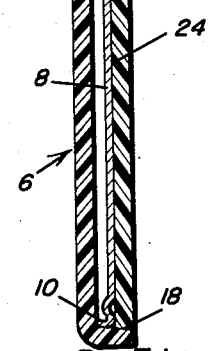
Greene B. Edwards, Jr.
INVENTOR.

2,797,513
Patented July 2, 1957

2,797,513
LICENSE PLATE COVER
Greene B. Edwards, Jr., Tuskegee, Ala.

Application September 4, 1953, Serial No. 378,496

2 Claims. (Cl. 40—125)

The present invention relates to so-called protectors for vehicle license plates and has more particular reference to means for effectively supporting and enclosing the plate and which is herein referred to as a license plate cover.

It is an object of the invention to structurally, functionally, and otherwise to improve upon similarly constructed and performing license plate and tag holders and protectors and, in doing so, to provide a simple, practical and economical adaptation in which manufacturers, dealers, users and others will find their respective requirements and needs satisfactorily met.

In carrying out the principles of the invention and to satisfactorily effect the improvements desired, the overall structural means is comprehensively defined and characterized by a support unit having an endless marginal retaining flange, the inwardly facing surface of which has a slight taper, a license plate fitted within the encompassing limits of said flange, said plate having a lateral marginal reinforcing flange at a right angle to the surface of the plate proper, said latter flange being slightly resilient and forcibly squeezed and wedged into place in said support unit, whereby said license plate is thus press-fitted and friction-held in its desired position, the retaining flange on said unit being of a width greater than the width of the license plate flange and an edge portion thereof extending beyond the viewable side of the license plate and providing a space, and a transparent cover panel occupying said space and being press-fitted therein and frictionally held by way of said retaining flange.

More specifically, novelty is predicated on a holder or support unit which is preferably constructed from moldable commercial plastics of a proper grade and wherein said unit, in one of its forms, is in the general nature of a simple pan-like receiver, the same being said to comprise a flat-faced backing plate which is either imperforate or apertured, as required, and which has an outstanding lateral endless retaining flange. The outer peripheral surface or perimeter of this flange may be of any suitable construction but the inner perimeter surface is tapered or inclined at the correct angle relative to the right angular position of the license plate flange in order to insure effective pocketing of the flanged license plate in the receptacle portion of the support unit and equally effective placement and holding of the transparent cover and protecting panel.

Then, too, novelty is predicated on the construction just defined wherein, if desired, an extra extension may be provided along one marginal edge, preferably the upper edge, and which is also marginally flanged to be used for advertising by placing a decal, or otherwise displaying the advertisement and using a transparent cover panel therefor.

What is more, novelty is predicated on a further adaptation wherein the stated support unit is a simple endless rectangular plastic or equivalent frame with the tapered wedging surfaces for the flanged edge portion of the license plate and which also supports the cover panel and, if desired, is protectively enclosed in a channel-shaped ornamental metal rim at least one flange of which may be utilized to assist in fitting and holding the transparent panel in its desired protective position.

Further objects, features, and advantages will become more readily apparent from the following description and the accompanying sheet of illustrative drawings.

In the drawings, wherein like numerals are employed to designate like parts throughout the views:

Figure 1 is what may be designated as a face elevational view of a license plate holder and cover constructed in accordance with the principles of the present invention;

Figure 2 is a section on the vertical line 2—2 of Figure 1 looking in the direction of the arrows;

Figure 3 is a view similar to Figure 2 with the several parts separated in readiness for assembly;

Figure 4 is a view based on Figures 1 and 2 showing the added extension which is used for accommodating an ad, or the like, as hereinbefore briefly described; and Figure 5 is a fragmentary sectional view showing a modified form of the invention.

Reference may be had to Figures 2 and 3 wherein the holder or support unit is denoted, broadly speaking, by the numeral 6. The principal features are, of course, the assembling and attaining flange means and more specifically this unit takes the form of a rectangular pan-like member which is preferably constructed from moldable commercial plastics. This unit actually forms a sort of a receptacle for the conventional license tag or plate 8 which latter is provided with the usual right angularly disposed endless marginal reinforcing flange 10. Unit 6 comprises a backing plate 12 the interior surface of which is smooth and flat as at 14. The endless lateral marginal flange is denoted by the numeral 16. The inner peripheral of perimeter surface of the flange is the important feature in that this has a gradual incline or so-called taper as at 18 and it tapers toward the flat abutment face 14. The outside marginal limits of this backing surface are denoted at 20 and the over-all area of this surface is less than the extreme outside area of the flange 10. The flange 10 is slightly flexible or resilient and when wedged "home," it is securely anchored and stays put. The difference in size or dimension of the cooperating parts is such that the normal slant of the surfaces 18 is approximately three-quarters of an inch. The outside perimeter surface of the reinforcing flange on the license plate is 90 degrees and this variation provides the desired wedging and retaining action once the license plate is press-fitted and forced by hand into the receptacle portion of the holder or support unit. It will be further noted that the width of the flange 16 is greater than the width of the flange 10 so that the right hand edge portion 22 of said flange projects beyond the viewable surface of the license plate. The extra space provides a pocket-like receiver for the insertable and removable friction-held transparent cover panel 24, a part which is also preferably of commercial plastics, which is the part shown separated in Figure 3 and assembled in Figure 2, to clearly illustrate the construction described and the points just made. In the modification shown in Figure 4 the only difference is that there is an added so-called extension 26 which runs along the upper part of the holder and this may be for the full length of the holder or just a portion thereof, as desired. In any event, the flange surface 28 and the surfaces 30 of the added flanges 32 are tapered and these tapered surfaces also serve to friction-hold the insertable and removable auxiliary cover panel 34. The ad (not detailed) is made possible by inserting a decalcomania or silk-screening on the so-called back side of the panel 34.

In the modification shown in Figure 5 a simple rectangular commercial plastic frame 36 is provided and this has tapering inner peripheral surfaces 38 to frictionally hold the reinforcing flange 40 of the license plate 42. Here again, there is an insertable and removable transparent cover panel 44 held in place as shown and for ornamental and reinforcing purposes a channel-shaped rim 46 is provided having at least one flange 48 which overaps the panel 44 to assist in keeping the latter in place. In certain instances, as shown in dotted lines at 50 in Figure 1, bolt holes may be provided to accommodate bolts on automobile attaching brackets and fixtures (not shown).

It is significant to point out here that the outer flange of the cover may, in practice, be metalized, that is, properly treated for both ornamentation and stability through the medium of a process in which plastic is coated with a substance that resembles metal. Alternatively, the flange may be specially painted to give the effect of what then appears to be a metal rim. Any equivalent "metal-finished" decoration may be utilized within the purview, it is believed, of the over-all inventive concept.

From the foregoing, the construction and operation of the device will be readily understood and further explanation is believed to be unnecessary. However, since numerous modifications and changes will readily occur to those skilled in the art, it is not desired to limit the invention to the exact structures shown and described, and accordingly all suitable modifications and equivalents may be resorted to, falling within the scope of the appended claims.

What is claimed as new is as follows:

1. In combination, a rectangular shallow pan-like unit molded from commercial plastics and providing a receptacle, said unit embodying a backing plate having a smooth flat interior abutment surface and an endless marginal flange projecting laterally beyond said abutment surface, said flange decreasing in thickness in a direction away from said abutment surface and providing outwardly slanting wedge-like friction-rtaining surfaces completely encompassing the adjacent marginal portions of said abutment surface, a flat license plate opposed to and spaced in parallelism from said abutment surface, said plate having a marginal reinforcing flange disposed at a right angle to the plate proper, said reinforcing flange being endless, slightly resilient, and forcibly squeezed and press-fitted all the way around and frictionally held in its given usable position, the area of said backing plate being sligtly less than the over-all outside area of the license plate, the edge portions of said reinforcing flange bearing against the cooperating marginal surface portions of said abutment surface, said retaining flange being of a width greater than the width of the license plate reinforcing flange and the outer free edge portion thereof projecting beyond the viewable side of said license plate proper and providing a cover panel receiving space, and a readily insertable transparent cover panel seated in said space and having its marginal edge portions press-fitted and frictionally held in place by way of said retaining flange.

2. The structure defined in claim 1 and the combination therewith of an extension projecting beyond one longitudinal flange portion of said retaining flange and substantially coextensive in length with the over-all length of the pan-like unit and having a lengthwise flange and two short, right angularly disposed end flanges cooperating with said one portion of said flange, the adjacent interior surfaces of all of the flanges on said extension being bevelled and an auxiliary removable panel carried by said extension and held in place by the bevelled surfaces of the cooperating flanges.

References Cited in the file of this patent

UNITED STATES PATENTS

| | | |
|---|---|---|
| 1,202,589 | Roosman | Oct. 24, 1916 |
| 2,176,253 | Fogarty | Oct. 17, 1939 |
| 2,361,479 | Joffo | Oct. 31, 1944 |
| 2,527,765 | Roehrl | Oct. 31, 1950 |
| 2,548,151 | Friedman | Apr. 10, 1951 |
| 2,599,382 | Goldberg | June 3, 1952 |
| 2,639,530 | Merrill | May 26, 1953 |
| 2,647,834 | Rabkin | Aug. 4, 1953 |